United States Patent
Sugimori et al.

(10) Patent No.: US 11,728,472 B2
(45) Date of Patent: Aug. 15, 2023

(54) NEGATIVE ELECTRODE FOR NONAQUEOUS ELECTROLYTE SECONDARY BATTERY, AND NONAQUEOUS ELECTROLYTE SECONDARY BATTERY

(71) Applicants: Panasonic Corporation, Kadoma (JP); TOYOTA JIDOSHA KABUSHIKI KAISHA, Toyota (JP)

(72) Inventors: Masanori Sugimori, Osaka (JP); Yusuke Fukumoto, Osaka (JP); Yuji Yokoyama, Hyogo (JP); Nobuhiro Hirano, Osaka (JP); Yo Kato, Nagoya (JP)

(73) Assignees: PANASONIC HOLDINGS CORPORATION, Osaka (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 296 days.

(21) Appl. No.: 17/123,963

(22) Filed: Dec. 16, 2020

(65) Prior Publication Data

US 2021/0193992 A1 Jun. 24, 2021

(30) Foreign Application Priority Data

Dec. 23, 2019 (JP) .............................. JP2019-231706

(51) Int. Cl.
| | |
|---|---|
| *H01M 4/62* | (2006.01) |
| *H01M 4/133* | (2010.01) |
| *H01M 4/583* | (2010.01) |
| *H01M 4/36* | (2006.01) |
| *H01M 10/0525* | (2010.01) |

(Continued)

(52) U.S. Cl.
CPC .......... *H01M 4/364* (2013.01); *H01M 4/133* (2013.01); *H01M 4/134* (2013.01); *H01M 4/366* (2013.01); *H01M 10/0525* (2013.01); *H01M 2004/021* (2013.01); *H01M 2004/027* (2013.01)

(58) Field of Classification Search
None
See application file for complete search history.

(56) References Cited

U.S. PATENT DOCUMENTS

| | | | |
|---|---|---|---|
| 2004/0248010 A1* | 12/2004 | Kato ..................... | H01M 4/366 429/231.8 |
| 2014/0186702 A1* | 7/2014 | Takahata ............... | H01M 4/364 429/211 |

(Continued)

FOREIGN PATENT DOCUMENTS

| | | | |
|---|---|---|---|
| WO | WO-2018225515 A1 * | 12/2018 | ........... H01M 4/133 |
| WO | 2019/187537 A1 | 10/2019 | |

*Primary Examiner* — Yoshitoshi Takeuchi
(74) *Attorney, Agent, or Firm* — WHDA, LLP (57) ABSTRACT

A negative electrode for a nonaqueous electrolyte secondary battery, which is an example of embodiments, comprises a negative electrode core body and a negative electrode mixture layer provided on the surface of the negative electrode core body. The negative electrode mixture layer includes graphite and fibrous carbon. The BET specific surface area of the graphite included in the first region is smaller than the BET specific surface area of the graphite included in the second region. In addition, the average length of the fibrous carbon included in the first region is longer than the average length of the fibrous carbon included in the second region.

5 Claims, 3 Drawing Sheets

(51) Int. Cl.
*H01M 4/134* (2010.01)
*H01M 4/02* (2006.01)

(56) References Cited

U.S. PATENT DOCUMENTS

| | | | |
|---|---|---|---|
| 2017/0040616 A1* | 2/2017 | Lee | H01M 4/1393 |
| 2019/0305308 A1* | 10/2019 | Lee | H01M 4/133 |
| 2020/0119336 A1* | 4/2020 | Shinomiya | H01M 4/133 |

* cited by examiner

NEGATIVE ELECTRODE FOR NONAQUEOUS ELECTROLYTE SECONDARY BATTERY, AND NONAQUEOUS ELECTROLYTE SECONDARY BATTERY

CROSS REFERENCE TO RELATED APPLICATION

The entire disclosure of Japanese Patent Application No. 2019-231706 filed on Dec. 23, 2019 including the specification, claims, drawings, and abstract is incorporated herein by reference in its entirety.

TECHNICAL FIELD

The present disclosure relates to a negative electrode for a nonaqueous electrolyte secondary battery, and to a nonaqueous electrolyte secondary battery using that negative electrode.

BACKGROUND

The negative electrode of a nonaqueous electrolyte secondary battery, such as a lithium ion battery, comprises a negative electrode core sheet and a negative electrode mixture layer provided on the surface of the core sheet. In general, the negative electrode mixture layer includes a negative electrode active material and a binder, and has a uniform layer structure. However, in recent years, negative electrode mixture layers including multiple layers that are different in the type, content, and the like of a negative electrode active material have also been proposed. For example, Patent Literature 1 discloses a negative electrode comprising a negative electrode mixture layer having a first layer and a second layer formed in sequence from the negative electrode core sheet side, wherein the first layer includes a first carbon based active material with a 10% proof stress of 3 MPa or less and a silicon based active material containing Si, and the second layer includes a second carbon based active material with a 10% proof stress of 5 MPa or more.

CITATION LIST

Patent Literature

PATENT LITERATURE 1: International Publication No. WO 2019/187537

SUMMARY

Technical Problem

Due to the change in volume of the negative electrode associated with charging and discharging of the battery, the conductive path is sometimes cut off in a part of the negative electrode mixture layer. Also, as the amount of isolated negative electrode active material increases due to the cut-off of the conductive path, it leads to a decrease in the output characteristics. The technology of Patent Literature 1 contributes to the suppression of the cut-off of the conductive path in the negative electrode mixture layer, but there is still room for improvement.

Solution to Problem

A negative electrode for a nonaqueous electrolyte secondary battery according to the present disclosure is a negative electrode for a nonaqueous electrolyte secondary battery, comprising a negative electrode core sheet and a negative electrode mixture layer provided on the surface of the negative electrode core sheet, and is characterized by the fact that the negative electrode mixture layer includes graphite and fibrous carbon, and that, when the range from the surface of the negative electrode mixture layer on the side opposite to the negative electrode core sheet to 40% of the thickness of the mixture layer is defined as a first region, and the range from the interface between the negative electrode mixture layer and the negative electrode core sheet to 40% of the thickness of the mixture layer is defined as a second region, the BET specific surface area of the graphite included in the first region is smaller than the BET specific surface area of the graphite included in the second region and the average length of the fibrous carbon included in the first region is longer than the average length of the fibrous carbon included in the second region.

A nonaqueous electrolyte secondary battery according to the present disclosure comprises the negative electrode described above, a positive electrode, and a nonaqueous electrolyte.

Advantageous Effects of Invention

According to the negative electrode for a nonaqueous electrolyte secondary battery according to the present disclosure, the cut-off of the conductive path associated with charging and discharging of the battery can be suppressed and the output characteristics of the battery can be improved.

BRIEF DESCRIPTION OF DRAWINGS

Embodiments of the present disclosure will be described based on the following figures, wherein.

DESCRIPTION OF EMBODIMENTS

As a result of intensive studies to solve the problem mentioned above, the present inventors have found that, by forming a layer structure in the negative electrode mixture layer that includes graphite with a small BET specific surface area and long fibrous carbon on the surface side, and graphite with a large BET specific surface area and short fibrous carbon on the core sheet side, the output characteristics of the battery are considerably improved.

In general, since graphite with a small BET specific surface area has hard particles that are difficult to crush during the forming of the negative electrode, gaps are likely to be formed between the graphite particles on the surface side of the negative electrode mixture layer where such graphite is present in a large amount. Therefore, on the surface side of the negative electrode mixture layer, for example, the permeability of the nonaqueous electrolyte is good, which contributes to the improvement of the output characteristics. Meanwhile, the more gaps between the particles, the more difficult it is to form the conductive path. According to the negative electrode of the present disclosure, it is considered that the use of long fibrous carbon on the surface side of the negative electrode mixture layer forms a good conductive path, which maintains excellent output characteristics even after a charging and discharging cycle.

On the other hand, graphite with a large BET specific surface area is likely to occlude more lithium ions and contributes to a higher battery capacity, but the change in volume associated with charging and discharging is large, and there is a concern that the conductive path may be cut off during charging and discharging. According to the negative electrode of the present disclosure, it is considered that, by using short fibrous carbon on the core sheet side of the negative electrode mixture layer, a good conductive path can be maintained even after repeated charging and discharging. In addition, the short fibrous carbon does not hinder the fillability of graphite, and is thus considered to improve the electrical contact between the graphite and the negative electrode core sheet.

A nonaqueous electrolyte secondary battery using the negative electrode of the present disclosure has excellent output characteristics, and has a high output retention after a charging and discharging cycle. This effect can be attributed to the synergistic effect of the above two-layered structure of the negative electrode mixture layer.

Hereinafter, embodiments of the negative electrode according to the present disclosure and a nonaqueous electrolyte secondary battery using that negative electrode will be described in detail. The embodiments described below are only examples, and the present disclosure is not limited to the following embodiments. Also, it has been assumed from the outset that multiple embodiments and variations described below will be selectively combined. In the present specification, a reference to "a numerical value (A) to a numerical value (B)" means the numerical value (A) or more and the numerical value (B) or less, unless otherwise stated.

Figure 1:
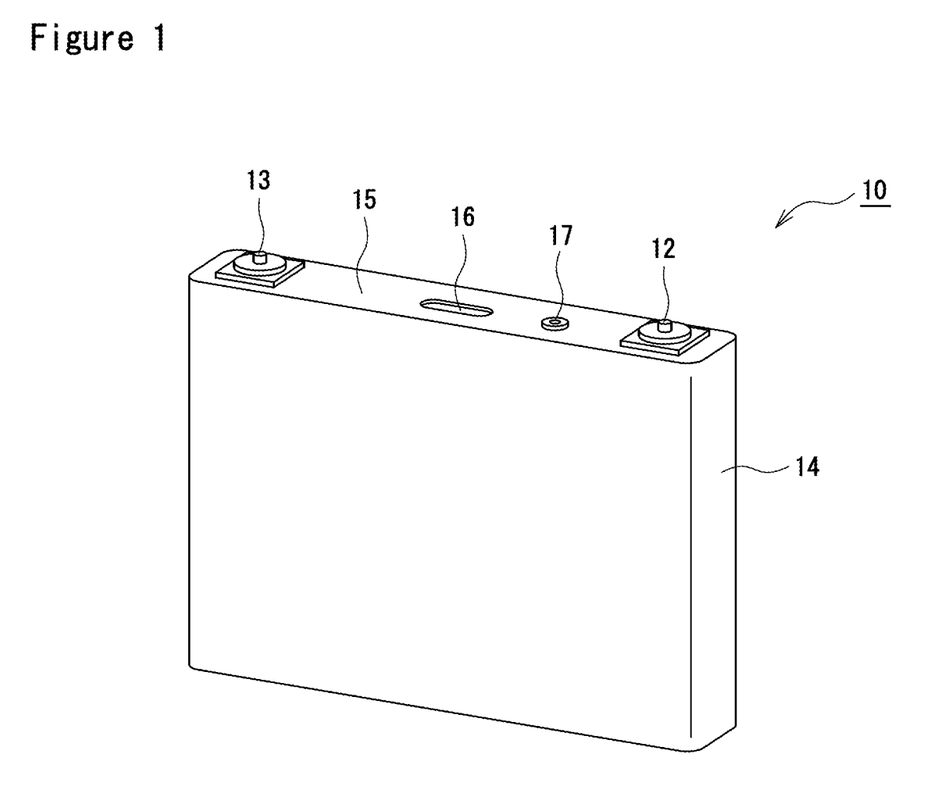
FIG. 1 is a perspective view illustrating the appearance of a nonaqueous electrolyte secondary battery, which is an embodiment.
Figure 2:
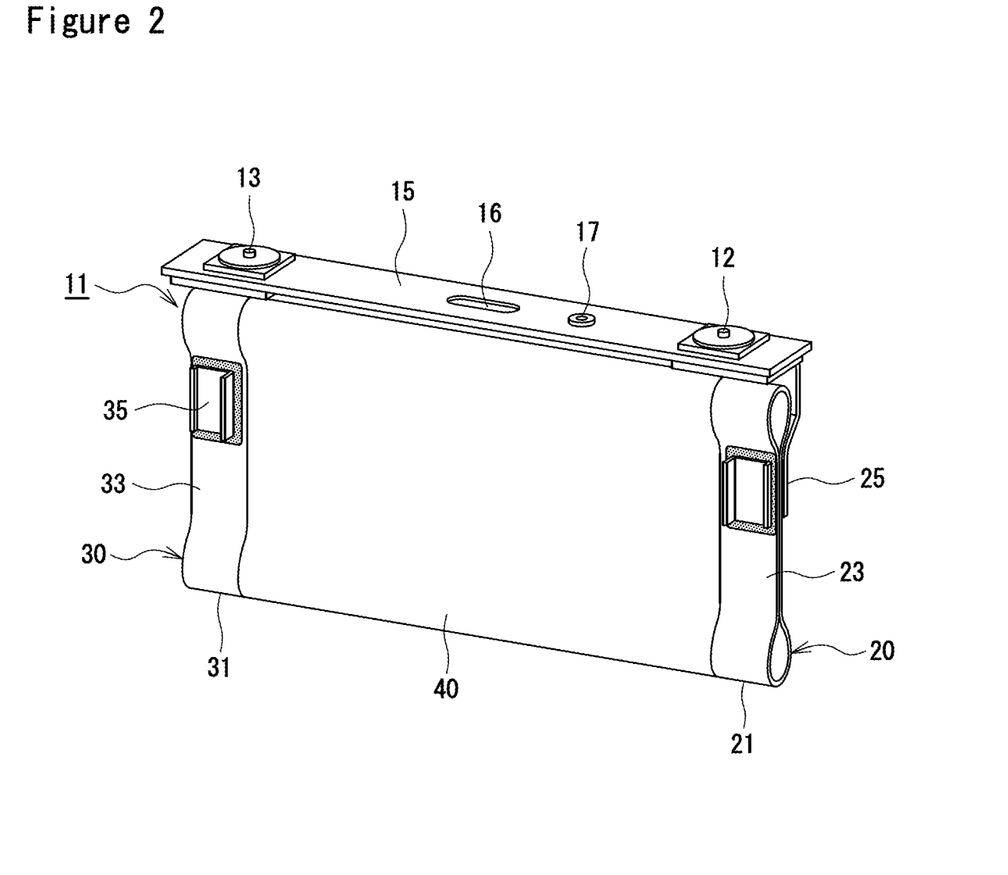
FIG. 2 is a perspective view illustrating an electrode assembly and sealing plate, which is an embodiment.

FIG. 1 is a perspective view illustrating the appearance of a nonaqueous electrolyte secondary battery 10, which is an embodiment, and FIG. 2 is a perspective view of an electrode assembly 11 and a sealing plate 15 constituting the nonaqueous electrolyte secondary battery 10. The nonaqueous electrolyte secondary battery 10 illustrated in FIG. 1 is a rectangular battery comprising a rectangular outer case 14, but the outer case of the battery is not limited to the outer case 14. The outer case may be, for example, a cylindrical outer case, or may be an outer case constituted with a laminated sheet including a metal layer and a resin layer. In addition, although the present embodiment illustrates an electrode assembly 11 having a winding structure, the electrode assembly may have a laminated structure in which a plurality of positive electrodes and a plurality of negative electrodes are alternately laminated one by one via a separator.

As illustrated in FIG. 1 and FIG. 2, the nonaqueous electrolyte secondary battery 10 comprises an electrode assembly 11, a nonaqueous electrolyte, and an outer case 14 that accommodates them. The outer case 14 is a flat, bottomed, rectangular tubular metal container with an opening. In addition, the nonaqueous electrolyte secondary battery 10 has a positive electrode terminal 12 electrically connected to a positive electrode 20 and a negative electrode terminal 13 electrically connected to a negative electrode 30. The positive electrode terminal 12 and the negative electrode terminal 13 are external connection terminals that are electrically connected to another nonaqueous electrolyte secondary battery 10, circuit, equipment, or the like.

The nonaqueous electrolyte includes a nonaqueous solvent and an electrolyte salt dissolved in the nonaqueous solvent. As the nonaqueous solvent, for example, esters, ethers, nitriles, amides, mixed solvents of two or more of these, and the like, are used. The nonaqueous solvent may contain halogen substituted solvents formed by substituting at least some of the hydrogen atoms in the above solvents with halogen atoms such as fluorine. As the electrolyte salt, for example, lithium salts such as $LiPF_6$ are used. Note that the electrolyte is not limited to a liquid electrolyte and may be a solid electrolyte using a gel polymer or the like.

The electrode assembly 11 is a winding type electrode assembly in which the positive electrode 20 and the negative electrode 30 are wound in a spiral shape via a separator 40 and formed into a flat shape. The positive electrode 20, the negative electrode 30, and the separator 40 are all long strip-shaped bodies. The positive electrode 20 has a positive electrode core sheet 21 and a positive electrode mixture layer (not shown) formed on both sides of the core sheet, and the negative electrode 30 has a negative electrode core sheet 31 and a negative electrode mixture layer 32 (see FIG. 3 below) formed on both sides of the core sheet. The electrode assembly 11 includes a flat portion and a pair of curved portions. The electrode assembly 11 is accommodated in the outer case 14 in a state where the winding axis direction is along the lateral direction of the outer case 14 and the width direction of the electrode assembly 11 in which the pair of curved portions are aligned is along the height direction of the nonaqueous electrolyte secondary battery 10.

The nonaqueous electrolyte secondary battery 10 comprises a positive electrode current collector 25 that connects the positive electrode 20 and the positive electrode terminal 12, and a negative electrode current collector 35 that connects the negative electrode 30 and the negative electrode terminal 13. At one end portion in the axial direction of the electrode assembly 11, a core sheet stacked portion 23 is formed in which an exposed portion of the positive electrode core sheet 21 is laminated, and at the other end portion in the axial direction, a core sheet stacked portion 33 is formed in which an exposed portion of the negative electrode core sheet 31 is laminated. The positive electrode current collector 25 and the negative electrode current collector 35 are both constituted with two conductive members, and these two members are welded to the core sheet stacked portion in a state where the core sheet stacked portion is compressed from both sides in the thickness direction.

The nonaqueous electrolyte secondary battery 10 comprises a sealing plate 15 that seals the opening of the outer case 14. In the present embodiment, the sealing plate 15 has an elongated rectangular shape, and the positive electrode terminal 12 and the negative electrode terminal 13 are disposed at one end side and at the other end side of the longitudinal direction of the sealing plate 15, respectively. The positive electrode terminal 12 and the negative electrode terminal 13 are both fixed to the sealing plate 15 via an insulating member. The sealing plate 15 is generally provided with a gas discharge valve 16 for discharging gas in the event of a battery malfunction, and a liquid injection portion 17 for injecting the electrolytic solution.

Hereinafter, the positive electrode 20, the negative electrode 30, and the separator 40 constituting the electrode assembly 11 will be described in detail, with particular reference to the negative electrode 30.

[Positive Electrode]

The positive electrode 20 has the positive electrode core sheet 21 and the positive electrode mixture layer provided on the surface of the positive electrode core sheet. As the positive electrode core sheet 21, a foil of a metal that is stable in the potential range of the positive electrode 20, such as aluminum or an aluminum alloy, a film in which such a metal is placed on the surface layer thereof, or the like, can be used. The positive electrode mixture layer includes a positive electrode active material, a conductive material, and a binder, and is preferably provided on both sides of the positive electrode core sheet 21. The positive electrode 20 can be fabricated by, for example, applying a positive electrode mixture slurry including a positive electrode active material, a conductive material, a binder, and the like on the positive electrode core sheet 21, drying the coating film, and then compressing it to form a positive electrode mixture layer on both sides of the positive electrode core sheet 21.

As the positive electrode active material, lithium transition metal composite oxides are used. Examples of the metallic element contained in the lithium transition metal composite oxides include Ni, Co, Mn, Al, B, Mg, Ti, V, Cr, Fe, Cu, Zn, Ga, Sr, Zr, Nb, In, Sn, Ta, W, and the like. Among the above, it is preferable to contain at least one of Ni, Co, and Mn. Suitable examples of the composite oxides include lithium transition metal composite oxides containing Ni, Co, and Mn, and lithium transition metal composite oxides containing Ni, Co, and Al.

As the conductive material included in the positive electrode mixture layer, mention may be made of carbon materials such as carbon black, acetylene black, ketjenblack, and graphite. As the binder included in the positive electrode mixture layer, mention may be made of fluororesins such as polytetrafluoroethylene (PTFE) and polyvinylidene fluoride (PVdF), polyacrylonitrile (PAN), polyimide resins, acrylic resins, polyolefin resins, and the like. Also, these resins may be used in combination with cellulose derivatives such as carboxymethyl cellulose (CMC) or salts thereof, polyethylene oxide (PEO), or the like.

[Negative Electrode]

Figure 3:
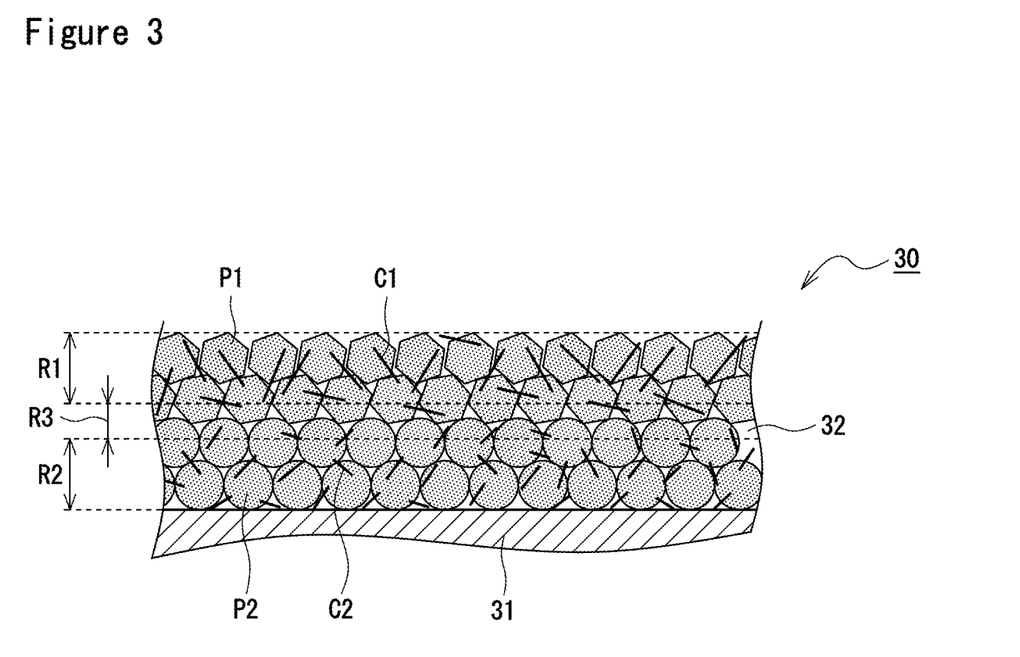
FIG. 3 is a sectional view of a negative electrode, which is an embodiment.

FIG. 3 is a sectional view illustrating a part of the negative electrode 30. As illustrated in FIG. 3, the negative electrode 30 has the negative electrode core sheet 31 and the negative electrode mixture layer 32 provided on the surface of the negative electrode core sheet 31. As the negative electrode core sheet 31, a foil of a metal that is stable in the potential range of the negative electrode 30, such as copper, a film in which such a metal is placed on the surface layer thereof, or the like, can be used. The negative electrode mixture layer 32 includes graphite and fibrous carbon. The fibrous carbon functions as a conductive material that forms a conductive path in the negative electrode mixture layer 32. In addition, preferably, the negative electrode mixture layer 32 further includes a binder and is provided on both sides of the negative electrode core sheet 31.

The graphite included in the negative electrode mixture layer 32 functions as a negative electrode active material that reversibly occludes and releases lithium ions. As the graphite, natural graphite such as flaky graphite, massive graphite, and earthy graphite, as well as artificial graphite such as massive artificial graphite (MAG) and graphitized mesophase carbon microbeads (MCMB), are used. In addition, the negative electrode mixture layer 32 may include, in addition to the graphite, which is a carbon based active material, a Si based active material containing Si. By using a carbon based active material and a Si based active material in combination, a higher capacity can be achieved while maintaining good cycle characteristics.

As the binder included in the negative electrode mixture layer 32, as in the case of the positive electrode 20, fluororesins, PAN, polyimides, acrylic resins, polyolefins, and the like can be used, but it is preferable to use a styrene-butadiene rubber (SBR). In addition, preferably, the negative electrode mixture layer further includes CMC or salts thereof, polyacrylic acid (PAA) or salts thereof, polyvinyl alcohol (PVA), and the like. Among the above, it is suitable to use SBR in combination with CMC or salts thereof or with PAA or salts thereof.

The negative electrode mixture layer 32 is characterized by the fact that, along the thickness direction, when the range of 40% of the thickness of the mixture layer from the surface of the negative electrode mixture layer 32 is defined as a region R1 (first region), and the range of 40% of the thickness of the mixture layer from the interface between the negative electrode mixture layer 32 and the negative electrode core sheet 31 is defined as a region R2 (second region), the constituents of each region are different from each other. Specifically, the BET specific surface area of the graphite included in the region R1 is smaller than the BET specific surface area of the graphite included in the region R2. In addition, the average length of the fibrous carbon included in the region R1 is longer than the average length of the fibrous carbon included in the region R2. That is, the negative electrode mixture layer 32 includes at least two kinds of graphite and at least two kinds of fibrous carbon.

When only graphite is used as the negative electrode active material, the content of graphite is preferably 80 to 98% by mass, more preferably 85 to 97% by mass, and particularly preferably 90 to 96% by mass relative to the mass of the negative electrode mixture layer 32. When the content of graphite is within such a range, a battery with a high capacity can be obtained. In the regions R1 and R2, the content rate of graphite is, for example, substantially the same.

The content of fibrous carbon is preferably 0.01 to 5% by mass, more preferably 0.02 to 4% by mass, and particularly preferably 0.04 to 3% by mass relative to the mass of the negative electrode mixture layer 32. When the content of fibrous carbon is within such a range, a good conductive path can be formed in the negative electrode mixture layer 32. In the regions R1 and R2, the content rate of fibrous carbon is, for example, substantially the same.

In the example illustrated in FIG. 3, graphite P1 and fibrous carbon C1 are present in the region R1 and graphite P2 and fibrous carbon C2 are present in the region R2, but as long as the conditions described above are met, at least one of graphite P2 and fibrous carbon C2 may be included in the region R1, and at least one of graphite P1 and fibrous carbon C1 may be included in the region R2. Here, the BET specific surface area of graphite P1 is smaller than the BET specific surface area of graphite P2, and the length of fibrous carbon C1 is longer than the length of fibrous carbon C2. Also, to the extent that the advantage of the present disclosure is not impaired, the negative electrode mixture layer 32 may include three or more kinds of graphite and fibrous carbon, and may include, for example, a particulate conductive material such as acetylene black.

A region R3 sandwiched between the regions R1 and R2, which is located in the center of the thickness direction of the negative electrode mixture layer 32, may have the same configuration as the region R1, or may have the same configuration as the region R2. Also, the boundary between the regions R1 and R2 may be present within the region R3. Alternatively, the physical properties of the graphite and the fibrous carbon included in the region R3 may be gradually changed along the thickness direction of the negative electrode mixture layer 32 such that as it gets closer to the region R1, the BET specific surface area of the graphite becomes smaller and the average length of the fibrous carbon becomes longer.

The thickness of the negative electrode mixture layer 32 on one side of the negative electrode core sheet 31 is, for example, 40 μm to 120 μm, and is preferably 50 μm to 90 μm. The thickness of the negative electrode mixture layer 32 is measured from a sectional image of the negative electrode 30 acquired by a scanning electron microscope (SEM). Similarly, the regions R1 and R2 are also determined from that SEM image. In general, the thickness of the negative electrode mixture layer 32 is approximately constant, but if there is variation in thickness, for example, in the area with a large thickness, the ranges of the regions R1 and R2 also become larger, and in the area with a small thickness, the ranges of the regions R1 and R2 also become smaller.

The BET specific surface area of the graphite included in the region R1 is preferably 0.5 $m^2/g$ or more and less than 2 $m^2/g$, more preferably 0.75 $m^2/g$ or more and 1.9 $m^2/g$ or less, and particularly preferably 1.0 $m^2/g$ or more and 1.8 $m^2/g$ or less. When the BET specific surface area of the graphite included in the region R1 is within such a range, the permeability of the nonaqueous electrolyte becomes good on the surface side of the negative electrode mixture layer 32, and the output characteristics are improved. The BET specific surface area of graphite is measured according to the BET method, using a conventionally and publicly known specific surface area measuring apparatus (for example, Macsorb (registered trademark) HM model-1201, manufactured by Mountech Co., Ltd.).

The BET specific surface area of the graphite included in the region R2 is preferably 2 $m^2/g$ or more and 5 $m^2/g$ or less, more preferably 2.5 $m^2/g$ or more and 4.5 $m^2/g$ or less, and particularly preferably 3 $m^2/g$ or more and 4 $m^2/g$ or less. When the BET specific surface area of the graphite included in the region R2 is within such a range, a larger amount of lithium ions is likely to be occluded, contributing to a higher battery capacity. On the other hand, the change in volume associated with charging and discharging becomes large.

In the negative electrode mixture layer 32, since, for example, in terms of mass, there is more graphite P1 than graphite P2 in the region R1 and there is more graphite P2 than graphite P1 in the region R2, the BET specific surface area of the graphite included in the region R1 is smaller than the BET specific surface area of the graphite included in the region R2. As the negative electrode active material, the region R1 may include substantially only graphite P1 and the region R2 may include substantially only graphite P2.

The median diameter on a volume basis of graphite P1 and P2 (hereinafter, referred to as "D50") is, for example, 5 μm to 30 μm, and is preferably 10 μm to 25 μm. The D50 of graphite P1 and P2 may be different from each other, or may be substantially the same. D50 means the particle diameter at which the cumulative frequency reaches 50% from the smallest particle diameter in the particle size distribution on a volume basis, also known as the medium diameter. The particle size distribution of graphite particles can be measured by using a laser diffraction type particle size distribution measuring apparatus (for example, MT3000II, manufactured by MicrotracBEL Corp.) and water as the dispersion media.

Graphite P1 comprises hard particles with a 10% proof stress of, for example, 5 MPa or more. The 10% proof stress means the pressure at which a graphite particle is compressed by 10% by volume ratio. The 10% proof stress can be measured for a single particle of graphite, using a micro-compression tester (MCT-211, manufactured by Shimadzu Corporation), or the like. In such a measurement, a particle with a particle diameter that is equivalent to D50 is used. Graphite P2 comprises, for example, particles that are softer than graphite P1, and has a 10% proof stress of 3 MPa or less. In the negative electrode mixture layer 32, the average value of the 10% proof stress of the graphite in the region R1 is preferably greater than the average value of the 10% proof stress of the graphite in the region R2.

Graphite P1 and P2 are fabricated by, for example, crushing coke (precursor), which is the main raw material, into a predetermined size, adding a binder to the crushed material to aggregate it, then calcining it at a high temperature of 2500° C. or more to graphitize it, and then sieving it. As the binder, it is preferable to use pitch. Some of the pitch is volatilized during the calcination step, and a part of the rest remains to be graphitized. The BET specific surface area of graphite can be adjusted according to, for example, the particle diameter of the precursor after crushing, the particle diameter of the precursor in its aggregated state, the amount of pitch to be added, the calcination temperature, and the like.

The fibrous carbon included in the negative electrode mixture layer 32 is a fibrous carbon based conductive material with a high aspect ratio, and has a function to form a conductive path in the negative electrode mixture layer 32. The aspect ratio (length/diameter) of fibrous carbon is preferably 10 or more, and is more preferably 50 or more. Examples of the fibrous carbon include carbon nanotubes (CNTs), carbon nanofibers (CNFs), vapor grown carbon fibers (VGCFs), electrospun carbon fibers, polyacrylonitrile (PAN) based carbon fibers, pitch based carbon fibers, and the like. Among the above, carbon nanotubes are preferable. Note that two or more kinds of fibrous carbon may be used in combination.

The carbon nanotube may be either a single wall carbon nanotube (SWCNT) or a multiwalled carbon nanotube (MWCNT). Moreover, as the MWCNT, for example, CNTs with a tubular structure in which graphene sheets composed of carbon six-membered rings are wound parallel to the fiber axis, CNTs with a platelet structure in which graphene sheets composed of carbon six-membered rings are arranged perpendicular to the fiber axis, CNTs with a herringbone structure in which graphene sheets composed of carbon six-membered rings are wound at an oblique angle to the fiber axis, and the like, can be used.

The average length of the fibrous carbon included in the region R1 is preferably 5 μm or more and less than 50 μm, more preferably 7.5 μm or more and 45 μm or less, and particularly preferably 10 μm or more and 40 μm or less. When the average length of the fibrous carbon included in the region R1 is within such a range, for example, a good conductive path can be formed in the region R1 where there are many gaps between the graphite particles, and such a conductive path is likely to be maintained even after a charging and discharging cycle. The average length of fibrous carbon is determined by selecting 100 fibrous carbon from a sectional SEM image of the negative electrode mixture layer 32, measuring the length thereof, and averaging those measured values.

The average length of the fibrous carbon included in the region R2 is preferably 0.01 μm or more and 5 μm or less, more preferably 0.05 μm or more and 4.5 μm or less, and particularly preferably 0.1 μm or more and 4 μm or less. When the average length of fibrous carbon is within such a range, the adhesiveness between the mixture layer and the core sheet can be kept well, and the current collectability are improved. Also, although the graphite included in the region R2 undergoes a large volume change associated with charging and discharging as described above, when the average length of fibrous carbon is within such a range, the cut-off of the conductive path caused by the volume change can be efficiently suppressed. In addition, since the graphite included in the region R2 comprises soft particles, the cut-off of the conductive path may also be suppressed by the deformation of the particle shape to follow the volume change.

As described above, the negative electrode mixture layer 32 may include a Si based active material. The Si based active material may be Si, but it is preferably a Si containing compound containing a silicon oxide phase and Si particles dispersed in that silicon oxide phase (hereinafter, referred to as "SiO"), or a Si containing compound containing a lithium silicate phase and Si particles dispersed in that lithium silicate phase (hereinafter, referred to as "LSX"). SiO and LSX may be used in combination. The content of the Si based active material is preferably 1 to 20% by mass, more preferably 2 to 15% by mass, and particularly preferably 3 to 10% by mass relative to the mass of the negative electrode active material.

Since the Si based active material such as SiO and LSX exhibits a larger volume change associated with charging and discharging compared to graphite, when the Si based active material is used in combination, the effect of improving the cycle characteristics by the negative electrode 30 becomes more remarkable. The Si based active material is, for example, uniformly included throughout the negative electrode mixture layer 32. Alternatively, the Si based active material may be included only in the region R1, or may be included only in the region R2. It may also be included in both regions R1 and R2, and may be included more in the region R1 or may be included more in the region R2, in terms of mass.

SiO and LSX comprise, for example, particles having a D50 that is smaller than the D50 of the graphite particles. The D50 of SiO and LSX is preferably 1 µm to 15 µm, and is more preferably 4 µm to 10 µm. On the surface of the SiO and LSX particles, a conductive layer constituted with a material having a high conductivity may be formed. Suitable examples of the conductive layer include carbon coatings. The thickness of the conductive layer is preferably 1 nm to 200 nm, and is more preferably 5 nm to 100 nm, in consideration of ensuring the conductivity and the diffusibility of lithium ions into the particles.

SiO comprises, for example, particles in which fine Si particles are dispersed in the silicon oxide phase. Suitable SiO has a sea island structure in which fine Si particles are approximately uniformly dispersed in a matrix of amorphous silicon oxide, and is represented by the general formula $SiO_x$ ($0.5 \leq x \leq 1.6$). The content rate of Si particles is preferably 35 to 75% by mass relative to the total mass of SiO from the viewpoint of achieving, for example, both battery capacity and cycle characteristics. For example, when the content rate of Si particles is too low, the charging and discharging capacity is reduced, and when the content rate of Si particles is too high, some of the exposed Si particles, which are not covered by silicon oxide, come into contact with the electrolyte, and the cycle characteristics are reduced.

The average particle diameter of the Si particles dispersed in the silicon oxide phase is generally 500 nm or less before charging and discharging, is preferably 200 nm or less, and is more preferably 50 nm or less. After charging and discharging, is preferably 400 nm or less and is more preferably 100 nm or less. By making the Si particles finer, the volume change during charging and discharging becomes smaller and the cycle characteristics are improved.

The average particle diameter of the Si particles is measured by observing the section of SiO using a scanning electron microscope (SEM) or a transmission electron microscope (TEM), specifically, as the average value of the longest diameters of 100 Si particles. The silicon oxide phase is constituted with, for example, a group of particles that are finer than the Si particles.

LSX comprises, for example, particles in which fine Si particles are dispersed in the lithium silicate phase. Suitable LSX has a sea island structure in which fine Si particles are approximately uniformly dispersed in a matrix of lithium silicate represented by the general formula $Li_{2z}SiO_{(2+z)}$ ($0<z<2$). The content rate of Si particles is preferably 35 to 75% by mass relative to the total mass of LSX, as in the case of SiO. Also, the average particle diameter of the Si particles is generally 500 nm or less before charging and discharging, is preferably 200 nm or less, and is more preferably 50 nm or less. The lithium silicate phase is constituted with, for example, a group of particles that are finer than the Si particles.

The lithium silicate phase is preferably constituted with a compound represented by $Li_{2z}SiO_{(2+z)}$ ($0<z<2$). That is, the lithium silicate phase does not include $Li_4SiO_4$ ($Z=2$). $Li_4SiO_4$ is an unstable compound and reacts with water to exhibit alkalinity, which may alter Si and reduce the charging and discharging capacity. The lithium silicate phase is suitably made up mainly of $Li_2SiO_3$ ($Z=1$) or $Li_2Si_2O_5$ ($Z=1/2$) from the viewpoint of stability, ease of fabrication, lithium ion conductivity, and the like. When $Li_2SiO_3$ or $Li_2Si_2O_5$ is the main component, the content of such a main component is preferably in excess of 50% by mass of the total mass of the lithium silicate phase, and is more preferably 80% by mass or more.

SiO can be fabricated by the following steps 1 to 3.
(1) Si and silicon oxide are mixed at a weight ratio of, for example, 20:80 to 95:5 to fabricate an admixture.
(2) Before or after the fabrication of the admixture described above, Si and silicon oxide are crushed into fine particles using a ball mill or the like.
(3) The crushed admixture is subjected to a heat treatment at, for example, 600 to 1000° C. in an inert atmosphere.

Note that LSX can be fabricated by using lithium silicate instead of silicon oxide in the steps described above.

The negative electrode 30 is fabricated by using, for example, a first negative electrode mixture slurry including graphite P1, fibrous carbon C1, and a binder, and a second negative electrode mixture slurry including graphite P2, fibrous carbon C2, and a binder. At first, the second negative electrode mixture slurry is applied to the surface of the negative electrode core sheet 31 and the coating film is dried. Then, the first negative electrode mixture slurry is applied onto the coating film formed by the second negative electrode mixture slurry, and the coating film is dried and compressed, thereby obtaining a negative electrode 30 in which the negative electrode mixture layer 32 having the layer structure described above is formed on both sides of the negative electrode core sheet 31. In the above method, the negative electrode mixture slurry for the surface side is applied after the negative electrode mixture slurry for the core sheet side is applied and then dried, but another method may be employed in which the negative electrode mixture slurry for the surface side is applied after the negative electrode mixture slurry for the core sheet side is applied and before the coating film has been dried. When the latter method is used, a mixture layer in which the negative electrode mixture slurry for the core sheet side and the negative electrode mixture slurry for the surface side are mixed together is likely to be formed.

[Separator]

As the separator 40, a porous sheet having ion permeability and insulation properties is used. Specific examples of the porous sheet include microporous thin films, woven fabrics, nonwoven fabrics, and the like. As the material of the separator 40, polyolefins such as polyethylene and polypropylene, cellulose, and the like are suitable. The separator 40 may be either a single layer structure or a laminated structure. On the surface of the separator 40, a heat resistant layer or the like may be formed.

EXAMPLES

Hereinafter, the present disclosure will be further described with reference to Examples, but the present disclosure is not limited to these Examples.

Example 1

[Fabrication of Positive Electrode]

As the positive electrode active material, a lithium transition metal composite oxide represented by the general formula $LiNi_{0.82}Co_{0.15}Al_{0.03}O_2$ is used. By mixing the positive electrode active material, acetylene black, and polyvinylidene fluoride at a solids mass ratio of 97:2:1 and by using N-methyl-2-pyrrolidone (NMP) as the dispersion medium, a positive electrode mixture slurry is prepared. Next, this positive electrode mixture slurry is applied to both sides of the positive electrode core sheet composed of aluminum foil, the coating film is dried and compressed, and then cut into a predetermined electrode size, thereby obtaining a positive electrode in which the positive electrode mixture layer is formed on both sides of the positive electrode core sheet.

[Preparation of First Negative Electrode Mixture Slurry]

By mixing carbon nanotubes with an average length of 6.0 μm and sodium carboxymethyl cellulose (CMC-Na) at a solids mass ratio of 1:1 and by using water as the dispersion medium, a conductive paste is prepared. By mixing graphite A (negative electrode active material) with a BET specific surface area of 1.5 m$^2$/g, the conductive paste, a dispersion of a styrene-butadiene rubber (SBR), and sodium carboxymethyl cellulose (CMC-Na) at a solids mass ratio of 100:1:1:1 and by using water as the dispersion medium, a first negative electrode mixture slurry is prepared. The solids mass ratio of graphite A, the carbon nanotubes, the styrene-butadiene rubber (SBR), and sodium carboxymethyl cellulose (CMC-Na) is 100:0.5:1:1.5.

[Preparation of Second Negative Electrode Mixture Slurry]

By mixing carbon nanotubes with an average length of 0.5 μm and sodium carboxymethyl cellulose (CMC-Na) at a solids mass ratio of 1:1 and by using water as the dispersion medium, a conductive paste is prepared. By mixing graphite B (negative electrode active material) with a BET specific surface area of 2.5 m$^2$/g, the conductive paste, a dispersion of SBR, and CMC-Na at a solids mass ratio of 100:1:1:1 and by using water as the dispersion medium, a second negative electrode mixture slurry is prepared. The solids mass ratio of graphite B, the carbon nanotubes, the styrene-butadiene rubber (SBR), and sodium carboxymethyl cellulose (CMC-Na) is 100:0.5:1:1.5.

[Fabrication of Negative Electrode]

The second negative electrode mixture slurry is applied to both sides of the negative electrode core sheet composed of copper foil, the coating film is dried, the first negative electrode mixture slurry is then applied onto that coating film, and the coating film is dried and compressed, thereby forming a negative electrode mixture layer on both sides of the negative electrode core sheet. The negative electrode core sheet having a negative electrode mixture layer formed thereon is cut into a predetermined electrode size, thereby obtaining a negative electrode. The amounts of the first and second negative electrode mixture slurries applied are the same, and the negative electrode mixture layer with a thickness of 160 μm (excluding the core sheet) is formed.

[Preparation of Nonaqueous Electrolytic Solution]

Ethylene carbonate (EC), methyl ethyl carbonate (EMC), and dimethyl carbonate (DMC) are mixed in a volume ratio of 3:3:4. In that mixed solvent, $LiPF_6$ is dissolved to a concentration of 1.0 mol/L, thereby preparing a nonaqueous electrolyte.

[Fabrication of Nonaqueous Electrolyte Secondary Battery]

The above positive electrode and the above negative electrode are wound in a spiral shape via a separator made of polyethylene and formed into a flat shape, thereby fabricating a winding type electrode assembly. In addition, a positive electrode lead made of aluminum and a negative electrode lead made of nickel are welded to an exposed portion of the positive electrode core sheet and to an exposed portion of the negative electrode core sheet, respectively. By accommodating this electrode assembly in an outer case constituted with an aluminum laminate, injecting the above nonaqueous electrolytic solution, and then sealing the opening of the outer case, a nonaqueous electrolyte secondary battery is fabricated. Note that the capacity of the fabricated nonaqueous electrolyte secondary battery is 750 mAh.

Example 2

A negative electrode and a nonaqueous electrolyte secondary battery are fabricated in the same manner as in Example 1 except that graphite A with a BET specific surface area of 0.9 m$^2$/g is used in the preparation of the first negative electrode mixture slurry and graphite B with a BET specific surface area of 3.1 m$^2$/g is used in the preparation of the second negative electrode mixture slurry.

Example 3

In the preparation of the first negative electrode mixture slurry, an admixture of graphite A and a Si containing compound (SiO) represented by $SiO_x$ (X=0.94) at a solids mass ratio of 90:10 is used as the negative electrode active material, and in the preparation of the second negative electrode mixture slurry, an admixture of graphite B and SiO at a solids mass ratio of 90:10 is used as the negative electrode active material. Then, a negative electrode and a nonaqueous electrolyte secondary battery are fabricated in the same manner as in Example 1 except for the above, and that the negative electrode mixture layer with a thickness of 160 μm (excluding the core sheet) is formed. The solids mass ratio of graphite A or B, SiO, the carbon nanotubes, the styrene-butadiene rubber (SBR), and sodium carboxymethyl cellulose (CMC-Na) is 90:10:0.5:1:1.5, and the amount and thickness of the mixture to be applied is regulated such that the capacity becomes similar to that of the nonaqueous electrolyte secondary battery of Example 1.

Example 4

In the preparation of the first negative electrode mixture slurry, an admixture of graphite A with a BET specific surface area of 0.9 m²/g and SiO at a solids mass ratio of 90:10 is used as the negative electrode active material, and in the preparation of the second negative electrode mixture slurry, an admixture of graphite B with a BET specific surface area of 3.1 m²/g and SiO at a solids mass ratio of 90:10 is used as the negative electrode active material. Then, a negative electrode and a nonaqueous electrolyte secondary battery are fabricated in the same manner as in Example 1 except for the above and that the negative electrode mixture layer with a thickness of 160 μm (excluding the core sheet) is formed. The solids mass ratio of graphite A or B, SiO, the carbon nanotubes, the styrene-butadiene rubber (SBR), and sodium carboxymethyl cellulose (CMC-Na) is 90:10:0.5:1:1.5. Again, the amount and thickness of the mixture to be applied is regulated such that the capacity becomes similar to that of the nonaqueous electrolyte secondary battery of Example 1.

Example 5

A negative electrode and a nonaqueous electrolyte secondary battery are fabricated in the same manner as in Example 1 except that carbon nanotubes with an average length of 30 μm are used in the preparation of the first negative electrode mixture slurry and carbon nanotubes with an average length of 4.0 μm are used in the preparation of the second negative electrode mixture slurry.

Comparative Example 1

A negative electrode and a nonaqueous electrolyte secondary battery are fabricated in the same manner as in Example 1 except that carbon nanotubes with an average length of 6.0 μm are used in the preparation of the second negative electrode mixture slurry.

Comparative Example 2

A negative electrode and a nonaqueous electrolyte secondary battery are fabricated in the same manner as in Example 1 except that carbon nanotubes with an average length of 0.5 μm are used in the preparation of the first negative electrode mixture slurry.

Comparative Example 3

A negative electrode and a nonaqueous electrolyte secondary battery are fabricated in the same manner as in Example 1 except that graphite B (BET specific surface area of 2.5 m²/g) is used instead of graphite A in the preparation of the first negative electrode mixture slurry.

Comparative Example 4

A negative electrode and a nonaqueous electrolyte secondary battery are fabricated in the same manner as in Example 1 except that graphite A (BET specific surface area of 1.5 m²/g) is used instead of graphite B in the preparation of the second negative electrode mixture slurry.

Comparative Example 5

A negative electrode and a nonaqueous electrolyte secondary battery are fabricated in the same manner as in Example 3 except that carbon nanotubes with an average length of 6.0 μm are used in the preparation of the second negative electrode mixture slurry.

Comparative Example 6

A negative electrode and a nonaqueous electrolyte secondary battery are fabricated in the same manner as in Example 3 except that carbon nanotubes with an average length of 0.5 μm are used in the preparation of the first negative electrode mixture slurry.

[Measurement of Output Characteristics]

For each of the secondary batteries of Examples and Comparative Examples, constant current charging is carried out under a temperature environment of 25° C. until the battery voltage reaches 4.2 V at a current value of 225 mA, followed by charging at a constant voltage of 4.2 V until the current value reaches 37.5 mA. Next, by discharging the battery voltage to 2.5 V at a current value of 225 mA, the rated capacity is determined. Then, at a current value of 225 mA, the battery is charged until it reaches 50% of its rated capacity. After that, the maximum current value that enables discharging for 10 seconds when the discharge final voltage is set to 2.5 V is measured, and the output value at a state of charge (SOC) of 50% for each battery is determined from the following equation.

Output value (SOC of 50%)=(maximum current value measured)×discharge final voltage (2.5 V)

Next, each battery is subjected to a cycle test. For each battery, a charging and discharging cycle consisting of constant current charging until the battery voltage reaches 4.2 V at a current value of 375 mA, an idle period of 15 minutes, constant current discharging until the battery voltage reaches 2.5 V at a current value of 375 mA, and an idle period of 15 minutes, is repeated 200 times. After 200 charging and discharging cycles, the output value after the cycle test is calculated in the same manner as for the initial output value.

| | Negative electrode mixture layer first region | | | Negative electrode mixture layer second region | | | Output characteristics | |
|---|---|---|---|---|---|---|---|---|
| | Graphite BET [m²/g] | CNT length [μm] | SiO | Graphite BET [m²/g] | CNT length [μm] | SiO | Beginning [W] | After cycles [W] |
| Example 1 | 1.5 | 6.0 | — | 2.5 | 0.5 | — | 22.0 | 18.3 |
| Example 2 | 0.9 | 6.0 | — | 3.1 | 0.5 | — | 22.2 | 18.4 |
| Example 3 | 1.5 | 6.0 | Present | 2.5 | 0.5 | Present | 23.1 | 18.5 |
| Example 4 | 0.9 | 6.0 | Present | 3.1 | 0.5 | Present | 23.2 | 18.7 |
| Example 5 | 0.9 | 30.0 | — | 3.1 | 4.0 | — | 22.2 | 18.5 |
| Comparative Example 1 | 1.5 | 6.0 | — | 2.5 | 6.0 | — | 21.1 | 17.5 |
| Comparative Example 2 | 1.5 | 0.5 | — | 2.5 | 0.5 | — | 21.0 | 16.8 |
| Comparative Example 3 | 2.5 | 6.0 | — | 2.5 | 0.5 | — | 21.8 | 17.1 |

-continued

| | Negative electrode mixture layer first region | | | Negative electrode mixture layer second region | | | Output characteristics | |
|---|---|---|---|---|---|---|---|---|
| | Graphite BET [m²/g] | CNT length [μm] | SiO | Graphite BET [m²/g] | CNT length [μm] | SiO | Beginning [W] | After cycles [W] |
| Comparative Example 4 | 1.5 | 6.0 | — | 1.5 | 0.5 | — | 22.0 | 17.8 |
| Comparative Example 5 | 1.5 | 6.0 | Present | 2.5 | 6.0 | Present | 23.0 | 17.5 |
| Comparative Example 6 | 1.5 | 0.5 | Present | 2.5 | 0.5 | Present | 22.7 | 17.4 |

As shown in Table 1, good output characteristics obtained at the beginning for the batteries of Examples are maintained even after the repeated cycles. This is presumably because both the conductive path and the migration path of lithium ions are ensured at the beginning and after the repeated cycles.

REFERENCE SIGNS LIST

10 Nonaqueous electrolyte secondary battery
11 Electrode assembly
12 Positive electrode terminal
13 Negative electrode terminal
14 Outer case
15 Sealing plate
16 Gas discharge valve
17 Liquid injection portion
20 Positive electrode
21 Positive electrode core sheet
23 Core sheet stacked portion
25 Positive Electrode current collector
30 Negative Electrode
31 Negative electrode core sheet
32 Negative electrode mixture layer
33 Core sheet stacked portion
35 Negative electrode current collector
40 Separator

The invention claimed is:

1. A negative electrode for a nonaqueous electrolyte secondary battery, comprising:
a negative electrode core sheet; and
a negative electrode mixture layer provided on a surface of the negative electrode core sheet,
wherein the negative electrode mixture layer includes graphite and fibrous carbon, and
wherein, when a range of 40% of a thickness of the mixture layer from a surface of the negative electrode mixture layer on a side opposite to the negative electrode core sheet is defined as a first region and a range of 40% of a thickness of the mixture layer from an interface between the negative electrode mixture layer and the negative electrode core sheet is defined as a second region,
a BET specific surface area of the graphite included in the first region is smaller than a BET specific surface area of the graphite included in the second region, and
an average length of the fibrous carbon included in the first region is longer than an average length of the fibrous carbon included in the second region, wherein the average length of the fibrous carbon included in the first region is 5 μm or more and less than 50 μm, and the average length of the fibrous carbon included in the second region is 0.05 μm or more and 4.5 μm or less.

2. The negative electrode for a nonaqueous electrolyte secondary battery according to claim 1, wherein the average length of the fibrous carbon included in the first region is 7.5 μm or more and 45 μm or less, and the average length of the fibrous carbon included in the second region is 0.1 μm or more and 4.0 μm or less.

3. The negative electrode for a nonaqueous electrolyte secondary battery according to claim 1, wherein the BET specific surface area of the graphite included in the first region is 0.75 m²/g or more and 1.9 m²/g or less, and the BET specific surface area of the graphite included in the second region is 2.5 m²/g or more and 4.5 m²/g or less.

4. The negative electrode for a nonaqueous electrolyte secondary battery according to claim 1, wherein the negative electrode mixture layer further includes a Si based active material containing Si.

5. A nonaqueous electrolyte secondary battery, comprising:
the negative electrode according to claim 1;
a positive electrode; and
a nonaqueous electrolyte.

* * * * *